United States Patent [19]
Arita et al.

[11] Patent Number: 5,929,202
[45] Date of Patent: Jul. 27, 1999

[54] METHOD FOR PRODUCTION OF ETHYLENE SULFIDE/SULFUR COPOLYMER AND ETHYLENE SULFIDE/SULFUR COPOLYMER

[75] Inventors: Yoshihiro Arita; Tomiyasu Ueta, both of Osaka, Japan; Thierry Aubert, Pau, France

[73] Assignees: Nippon Shokubai Co., Ltd., Japan; Elf Atochem S. A., France

[21] Appl. No.: 08/855,980

[22] Filed: May 14, 1997

[30] Foreign Application Priority Data

May 14, 1996 [JP] Japan .................................. 8-118834

[51] Int. Cl.$^6$ ................................................. C08G 75/00
[52] U.S. Cl. ............................................. 528/378; 528/379
[58] Field of Search ...................................... 528/378, 379

[56] References Cited

PUBLICATIONS

Duda et al., "Anionic Copolymerization of Elemental Sulfur with Porpylene Sulfide", Macromolecules 15:36–40 (1982).
Duda et al., "Anionic Copolymerization of Elemental Sulfur with Propylene Sulfide. Equilibrium Sulfur Concentration", J.Macromol.Sci–Chem., A20(9), pp. 967–978 (1983).
Duda et al., "Liquid oligomeric diols with high sulfur content from elemental sulfur, cyclic sulfides and dihydroxypolysulfides", Makomol.Chem.,Rapid Commun. 9;151–157 (1988).
Penczek et al., "Anionic copolymerisation of elemental sulphur", Nature 273:738–739 (1978).

*Primary Examiner*—Melvyn I. Marquis
*Attorney, Agent, or Firm*—Fish & Richardson P.C.

[57] ABSTRACT

This invention concerns a method for the production of an ethylene sulfide/sulfur copolymer which comprises copolymerizing ethylene sulfide with sulfur. This method permits an ethylene sulfide/sulfur copolymer as a novel copolymer.

7 Claims, 7 Drawing Sheets

METHOD FOR PRODUCTION OF ETHYLENE SULFIDE/SULFUR COPOLYMER AND ETHYLENE SULFIDE/SULFUR COPOLYMER

BACKGROUND OF THE INVENTION

1. Field of the Invention

This invention relates to a method for the production of an ethylene sulfide/sulfur copolymer. This invention also relates to an ethylene sulfide/sulfur copolymer. Specifically, this invention relates to a copolymer which is obtained by the copolymerization of ethylene sulfide with sulfur and which is useful as a vulcanizer and a vulcanization accelerator in tire quality rubber, industrial elastomer, and the like.

2. Description of the Prior Art

The copolymer of propylene sulfide with sulfur has been known for a long time to the art. Reports covering this copolymer have occurred in the literature including Nature, 273, pp. 738–739 (1978), Macromolecules, 15(1), pp. 36–40 (1982), J. Macromol. Sci.-Chem., A20(9), pp. 967–978 (1983), and Makromol. Chem., Rapid Commun., 9, 151–157 (1988). But any copolymer of ethylene sulfide with sulfur has not been known.

An object of this invention is to provide a novel ethylene sulfide/sulfur copolymer and a method for the production thereof.

SUMMARY OF THE INVENTION

The object mentioned above is accomplished by the following aspects, (1) through (14), of this invention.

(1) A method for the production of an ethylene sulfide/sulfur copolymer characterized by polymerizing ethylene sulfide with sulfur in the presence of at least one polymerization initiator selected from the group consisting of organic amines, quaternary ammonium salts, metal salts of 2-mercaptobenzothiazole, metal salts of dialkyl dithiocarbamic acid and metal salts of alkylxanthic acid.

(2) A method set forth in (1), wherein the organic amine is an aliphatic tertiary amine.

(3) A method set forth in (2), wherein the aliphatic tertiary amine is 1,4-diazabicyclo[2.2.2]octane.

(4) A method for production of an ethylene sulfide/sulfur copolymer characterized by adding at least one member selected from the group consisting of organic mercaptan compounds, polysulfide compounds and sulfenamide compounds during the copolymerization of ethylene sulfide with sulfur.

(5) A method set forth in (4), wherein the organic mercaptan compound is at least one member selected from the group consisting of alkyl mercaptans, aryl mercaptans, alkylaryl mercaptans, hydroxyalkyl mercaptans, thioglycolic acid alkyl esters, and mercaptopropionic acid alkyl esters.

(6) A method set forth in (4), wherein the polysulfide compound is at least one member selected from the group consisting of alkyl polysulfides, hydroxyalkyl polysulfides, tetralkylthiuram polysulfides, dibenzothiazyl polysulfides and polythiodimorpholines.

(7) A method set forth in (4), wherein the sulfenamide compound is at least one member selected from the group consisting of N-cyclohexyl-2-benzothiazolylsulfenamide, N-t-butyl-2-benzothiazolylsulfenamide, N-oxydiethylene-2-benzothiazolylsulfenamide, N,N-dicyclohexyl-2-benzothiazolylsulfenamide and N,N-diisopropyl-2-benzothiazolylsulfenamide.

(8) A method for production of an ethylene sulfide/sulfur copolymer characterized by using a water-miscible solvent as a polymerization solvent during the copolymerization of ethylene sulfide with sulfur.

(9) A method set forth in (8), wherein the water-miscible solvent is an ether type compound or a ketone type compound.

(10) A method set forth in (9), wherein the ether type compound is at least one member selected from the group consisting of tetrahydrofuran, dioxolane, and dioxane.

(11) A method set forth in (9), wherein the ketone type compound is acetone.

(12) A method set forth in any of (1) through (11), wherein the polymerization is carried out under the refluxing conditions of a polymerization solvent.

(13) A method set forth in any of (1) through (12), wherein the polymerization temperature is not less than 20° C. and less than 160° C.

(14) An ethylene sulfide/sulfur copolymer obtained by the method for production set forth in any of (1) through (13).

The method for the production of an ethylene sulfide/sulfur copolymer of this invention allows an ethylene sulfide/sulfur copolymer to be produced conveniently. The ethylene sulfide/sulfur copolymer consequently obtained is a novel copolymer which is useful in the field of rubber industry.

DESCRIPTION OF PREFERRED EMBODIMENT

Figure 1:
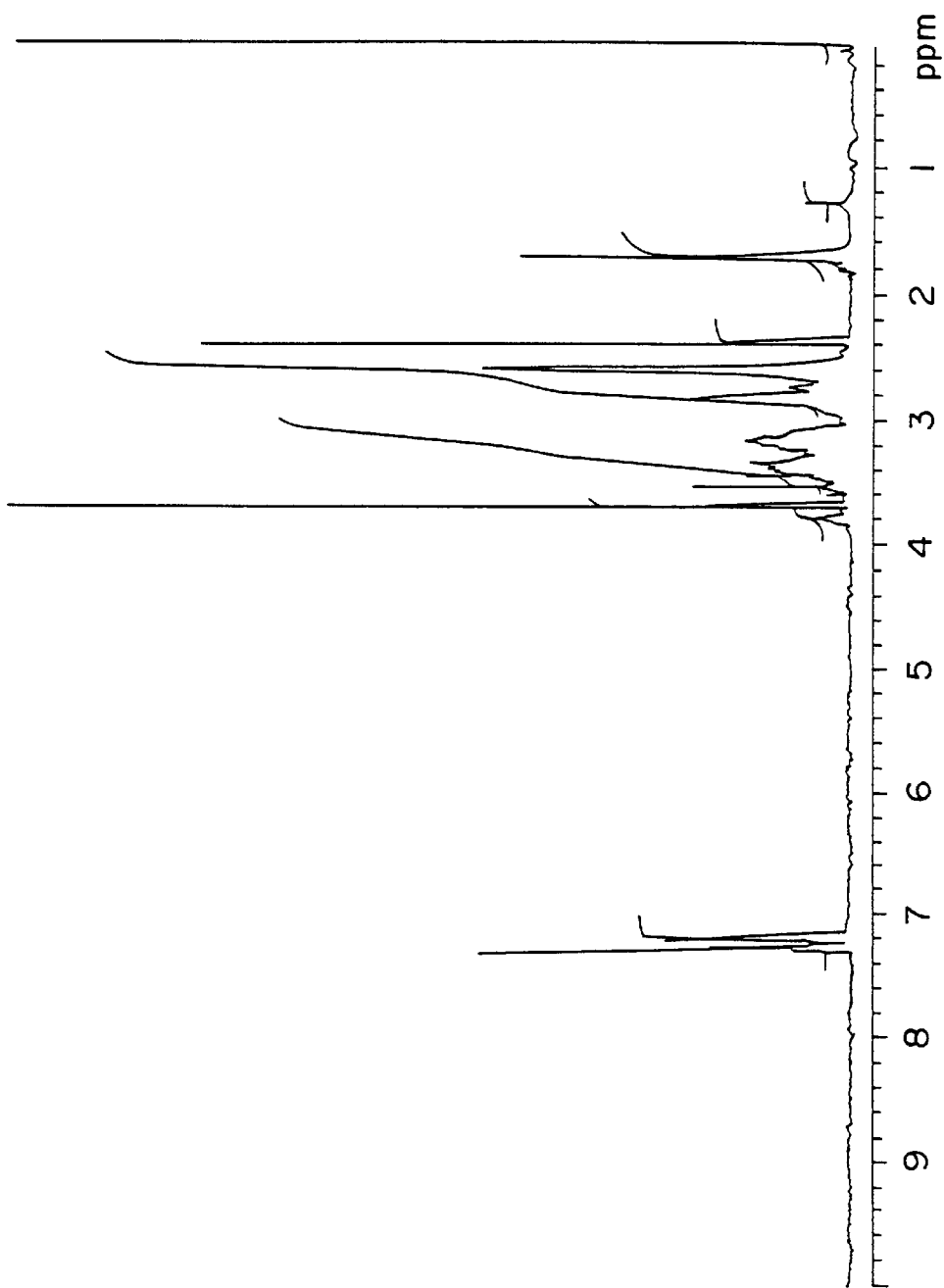
FIG. 1 is a $^1$H-NMR spectrum of the copolymer obtained in Example 2.
Figure 2:
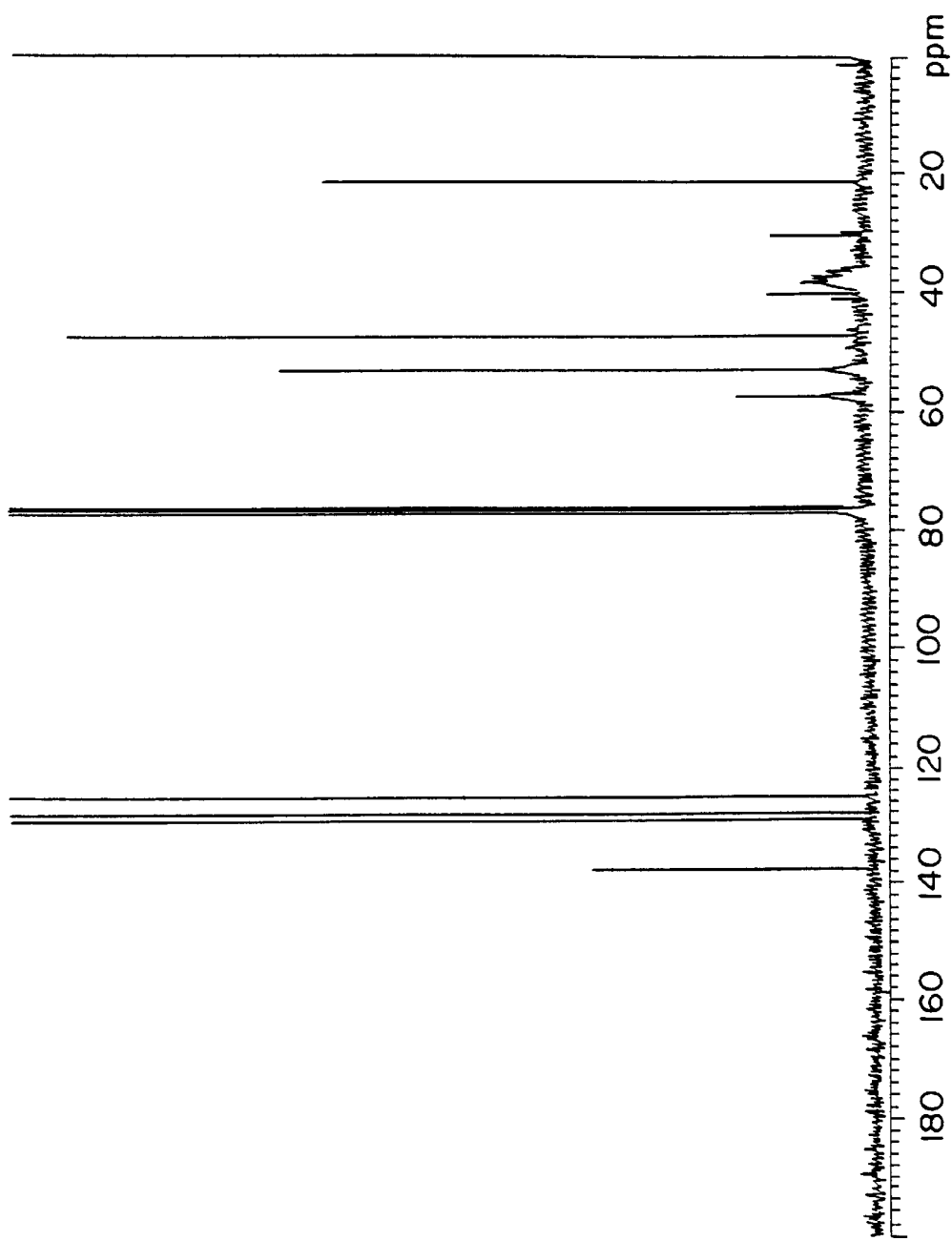
FIG. 2 is a $^{13}$C-NMR spectrum of the copolymer obtained in Example 2.
Figure 3:
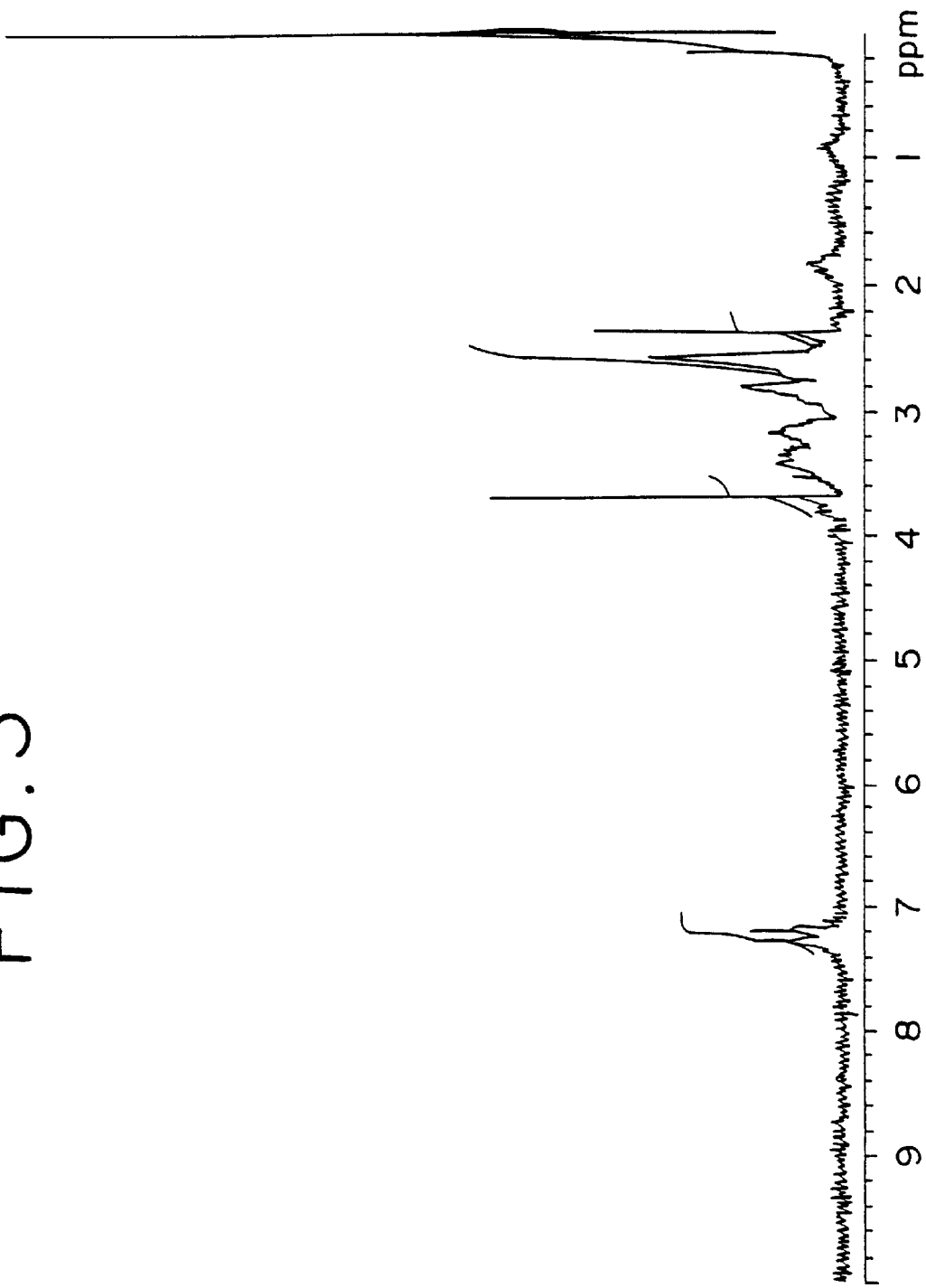
FIG. 3 is a $^1$H-NMR spectrum of the copolymer obtained in Example 20.
Figure 4:
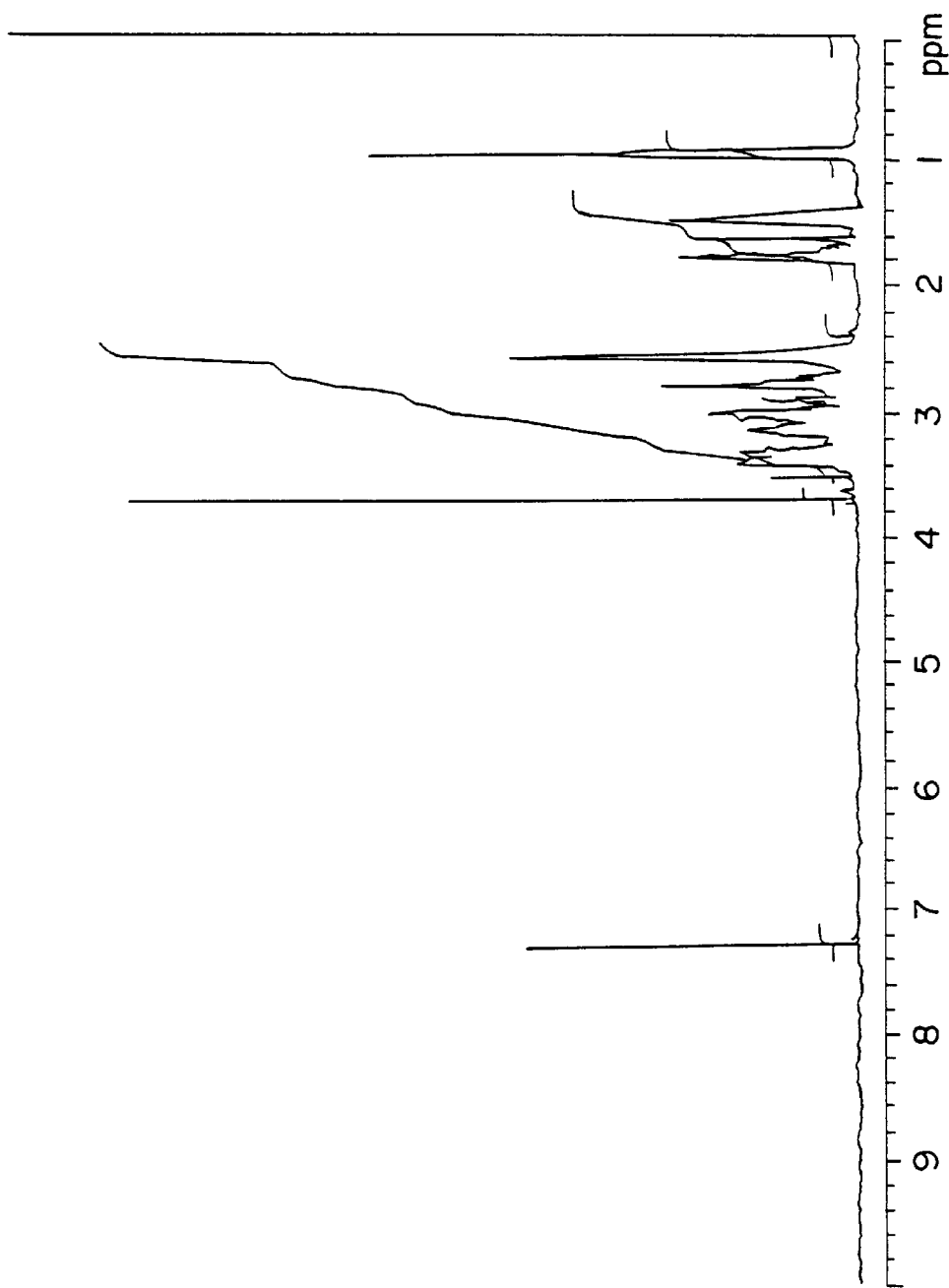
FIG. 4 is a $^1$H-NMR spectrum of the copolymer obtained in Example 23.
Figure 5:
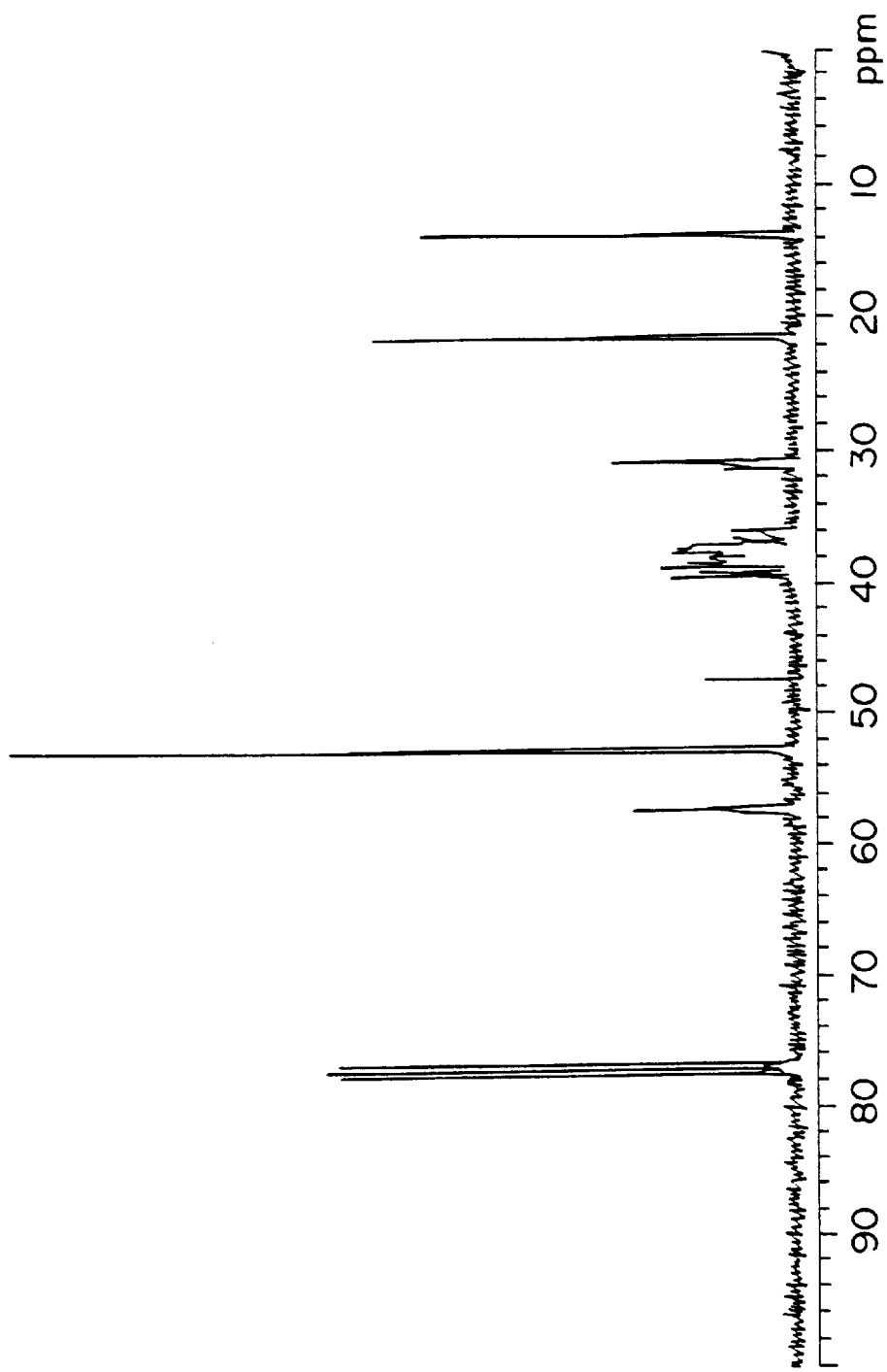
FIG. 5 is a $^{13}$C-NMR spectrum of the copolymer obtained in Example 23.
Figure 6:
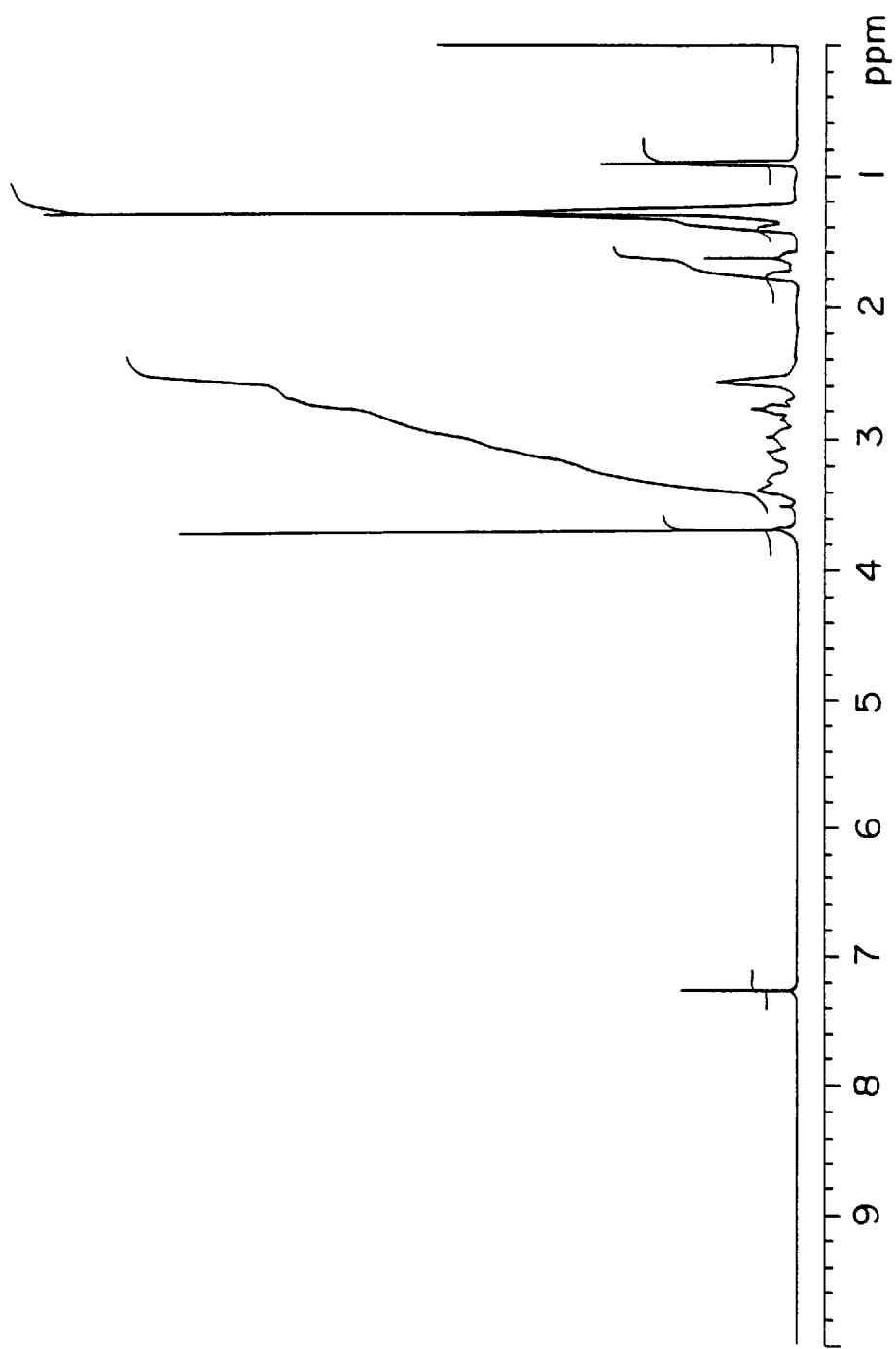
FIG. 6 is a $^1$H-NMR spectrum of the copolymer obtained in Example 28.
Figure 7:
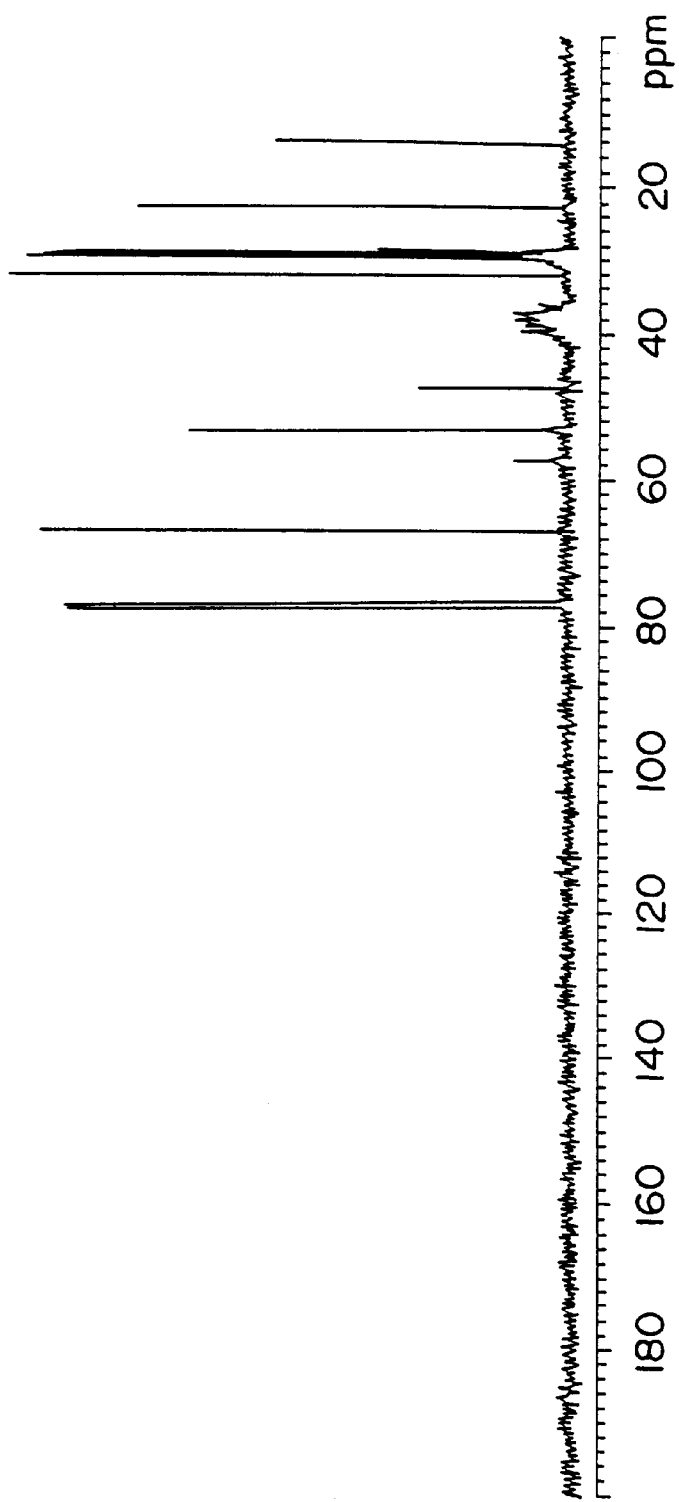
FIG. 7 is a $^{13}$C-NMR spectrum of the copolymer obtained in Example 28.

One characteristics of this invention is that ethylene sulfide is polymerized with sulfur in the presence of at least one polymerization initiator selected from the group consisting of organic amines, quaternary ammonium salts, metal salts of 2-mercaptobenzothiazole, metal salts of dialkyl dithiocarbamic acid and metal salts of alkylxanthic acid, to produce an ethylene sulfide/sulfur copolymer.

Another characteristics of this invention is that in the production of an ethylene sulfide/sulfur copolymer by the copolymerization of ethylene sulfide with sulfur, at least one member selected from the group consisting of organic mercaptan compounds, polysulfide compounds and sulfenamide compounds (hereinafter referred to as "an additive" in some cases) is added in order to adjust the molecular weight of the produced copolymer.

Further characteristics of this invention is that in the production of an ethylene sulfide/sulfur copolymer by the copolymerization of ethylene sulfide with sulfur, a water-miscible solvent is used as a polymerization solvent.

Now, the present invention is described specifically below.

The ethylene sulfide which is used in this invention is a compound represented by the following formula (1).

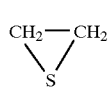

(1)

The sulfur which is used in this invention may be sulfur recovered from hydrogen sulfide as a raw material emanating from the process of petroleum refining or sulfur occurring in nature. As typical examples of the form in which the sulfur is used herein, sublimed sulfur, precipitated sulfur, flower of sulfur, and colloidal sulfur may be cited.

The reaction for copolymerizing ethylene sulfide with sulfur is generally carried out in a polymerization solvent in the presence of a polymerization initiator.

Though the copolymerization ratio of ethylene sulfide to sulfur is not particularly limited, the molar ratio of ethylene sulfide to sulfur atom is appropriately in the range of 2:1 to 1:9, preferably 1:1 to 1:5. If the molar ratio deviates from this range, the amount of either of the monomers being copolymerized will be unduly small and the produced copolymer will tend to be prevented from acquiring the characteristics thereof.

The polymerization initiator which is used in this invention may be any of the known initiators which are generally used for the anionic polymerization, cationic polymerization, or coordination polymerization.

As typical examples of the anionic polymerization initiator which can be used in this invention, ammonia, organic primary amines such as methylamine, ethylamine, butylamine, and ethylenediamine, organic secondary amines such as diethylamine, dibutylamine, pyrrolidine, piperidine, piperazine, diphenylamine, N,N'-diphenylphenylenediamine, and diphenylguanidine, organic tertiary amines such as trimethylamine, triethylamine, tributylamines, pyridine, 1,4-diazabicyclo[2.2.2]octane, 1,8-diazabicyclo[5.4.0]-7-undecene, and tetramethylethylenediamine, quaternary ammonium salts such as tetramethyl ammonium hydroxide, tetrabutylammonium acetate, and tetrabutylammonium benzoate, organic phosphine compounds such as triphenylphosphine and tributylphosphine, inorganic bases such as potassium hydroxide and sodium hydroxide, organic bases such as sodium methoxide, sodium thiomethoxide, sodium thiophenoxide, sodium salt of 2-mercaptobenzothiazole, sodium salt of 2-mercaptobenzoimidazole, potassium salt of ethylxanthic acid, ammonium salt of diethyldithiophosphoric acid, sodium salt of dimethyldithiocarbamic acid, sodium naphthalene, and alkyl lithium may be cited.

As typical examples of the cationic polymerization initiator which can be used in this invention, protonic acids such as hydrochloric acid, sulfuric acid, formic acid, methanesulfonic acid, and p-toluenesulfonic acid, Lewis acids such as titanium tetrachloride, aluminum chloride, boron trifluoride diethylether complex, and alkylating agents such as dimethyl sulfate, methyl p-toluenesulfonate, and triethyloxonium tetrafluoroborate may be cited.

As typical examples of the coordination polymerization initiator which can be used in this invention, such metal compounds as diethyl zinc, zinc oxide, zinc sulfide, zinc carbonate, zinc acetate, cadmium carbonate, triethylaluminium, zinc dimethyldithiocarbamate, zinc diethyldithiocarbamate, zinc dibutyldithiocarbamate, zinc N-ethyl-N-phenyldithiocarbamate, zinc N-pentamethylenedithiocarbamate, zinc dibenzyldithiocarbamate, copper dimethyldithiocarbamate, ferric dimethyldithiocarbamate, tellurium diethyldithiocarbamate, nickel dibutyldithiocarbamate, zinc salt of 2-mercaptobenzothiazole, zinc salt of 2-mercaptobenzoimidazole, zinc isopropylxanthate, and zinc butylxanthate may be cited.

Among other polymerization initiators cited above, at least one polymerization initiator selected from the group consisting of the organic amines, the quaternary ammonium salts, the metal salts of 2-mercaptobenzothiazole, the metal salts of dialkyldithiocarbamic acids and the metal salts of alkylxanthic acid may be used preferably in terms of easy handling. The aliphatic tertiary amines prove particularly advantageous. Among the aliphatic tertiary amines, 1,4-diazabicyclo[2.2.2]octane having high basicity is most advantageous.

Though the amount of the polymerization initiator to be used is not particularly limited, it is appropriately in the range of 0.01 to 20 mol %, preferably in the range of 0.1 to 5 mol %, based on the total number of mols of ethylene sulfide and sulfur atom. If the amount of the polymerization initiator used is less than 0.1 mol %, the polymerization will proceed so slowly as renders the production uneconomical. If this amount exceeds 20 mol %, the excess polymerization initiator persisting in the product will exert an adverse effect.

In this invention, at least one member selected from the group consisting of organic mercaptan compounds, polysulfide compounds and sulfenamide compounds is preferably added in the copolymerization reaction system for the purpose of adjusting the molecular weight of the obtained ethylene sulfide/sulfur copolymer.

As typical examples of the organic mercaptan compound which is usable in this invention, alkyl mercaptans such as methyl mercaptan, ethyl mercaptan, propyl mercaptan, isopropyl mercaptan, butyl mercaptan, t-butyl mercaptan, octyl mercaptan, dodecyl mercaptan, and t-dodecyl mercaptan, aryl mercaptans such as thiophenol, alkylaryl mercaptans such as p-nonylthiophenol, hydroxyalkyl mercaptans such as 2-mercaptoethanol and 1-mercapto-2-propanol, thioglycolic acid alkyl esters such as methyl thioglycolate, ethyl thioglycolate, butyl thioglycolate, and 2-ethylhexyl thioglycolate, mercaptopropionic acid alkyl esters such as methyl 3-mercaptopropionate, ethyl 3-mercaptopropionate, and butyl 3-mercaptopropionate, and heterocycle-containing mercaptans such as 2-mercaptobenzothiazole and 2-mercaptobenzoimidazole may be cited.

As typical examples of the polysulfide compound which is usable in this invention, alkyl polysulfides such as dimethyl disulfide, dibutyl disulfide, di-t-butyl trisulfide, di-t-nonyl trisulfide, di-t-dodecyl trisulfide, di-t-butyl pentasulfide, di-t-nonyl pentasulfide, and di-t-dodecyl pentasulfide, hydroxyalkyl polysulfides such as dithiodiethanol, di-2-hydroxyethyl trisulfide, and di-2-hydroxyethyl pentasulfide, and dibenzothiazyl polysulfides such as dibenzothiazyl disulfide, tetraalkylthiuram polysulfides such as tetramethylthiuram disulfide, tetrabutylthiuram disulfide, and dipentamethylenethiuram tetrasulfide, polythiodimorpholines such as dithiodimorpholne, and other polysulfide compounds such as 2-(4-morpholinyl dithio) benzothiazole which are generally used as a vulcanization accelerator in the rubber industry may be cited.

As typical examples of the sulfenamide compound which is usable in this invention, N-cyclohexyl-2- benzothiazolylsulfenamide, N-t-butyl-2-benzothiazolylsulfenamide, N-oxydiethylene-2-benzothiazolylsulfenamide, N,N-dicyclohexyl-2-benzothiazolylsulfenamide and N,N-diisopropyl-2-benzothiazolylsulfenamide, and other sulfenamide compounds which are generally used as a vulcanization accelerator in the rubber industry may be cited.

Though the amount of the additive to be used is not particularly limited, it is appropriately not more than 50 mol %, preferably not more than 20 mol %, based on the total number of mols of ethylene sulfide and sulfur atom. If the amount exceeds 50 mol %, the excess organic mercaptan compound, polysulfide compound or sulfenamide compound which persists in the produced copolymer will manifest an adverse effect.

In the method of production of this invention, a terminating agent can be used in the sense of controlling the structure of the terminus of the polymer. As typical examples of the terminating agent, (meth) acrylic acids (or the esters thereof) such as (meth)acrylic acid, methyl (meth)acrylate, ethyl (meth)acrylate, butyl (meth)acrylates, and 2-ethylhexyl (meth) acrylate and halogen compounds such as allyl chloride, allyl bromide, and benzyl chloride may be cited.

Though the polymerization temperature in the method of production of this invention is not particularly limited, it is appropriately not less than 20° C. and less than 160° C., preferably in the range of 40° to 120° C. If the polymerization temperature is less than 20° C., the reaction speed will be so low as to render the production uneconomical. If it is not less than 160° C., the copolymer will not be easily obtained because the homopolymerization of sulfur preferentially proceeds. When the polymerization is performed at a temperature of less than 95° C., the copolymer tends to be obtained in a solid state because the solubility of sulfur in a polymerization solvent is low and the concentration of sulfur dissolved in the reaction system is small. When the polymerization is performed at a temperature of not less than 95° C., the copolymer tends to be obtained in a liquid state because the concentration of the dissolved sulfur is increased.

Advantageously, in the production of ethylene sulfide/sulfur copolymer of this invention, the polymerization is carried out under the refluxing conditions of a polymerization solvent which will be specifically described hereinbelow. By the polymerization under the refluxing conditions of a polymerization solvent, the copolymer is efficiently obtained because the homopolymerization otherwise liable to occur on the inner wall of the polymerization vessel or in the heat exchanger owning to the vaporization and condensation of ethylene sulfide can be prevented.

The polymerization solvent to be used in the method of production of this invention is not particularly limited. As typical examples of the polymerization solvent usable herein, ether type compounds such as tetrahydrofuran, dioxane, dioxolane, and dimethylethylene glycol, aromatic hydrocarbons such as benzene, toluene, and xylene, aliphatic hydrocarbons such as pentane, hexane, and cyclohexane, ketone type compounds such as acetone, methylethylketone, and methylisobutylketone, sulfur-containing compounds such as carbon disulfide and sulfur chloride, halogen-containing compounds such as methylene chloride and chloroform, ester compounds such as ethyl acetate and butyl acetate, alcohol compounds such as methanol, ethanol, and isopropanol, glycol ethers such as methyl cellosolve, ethyl cellosolve, butyl cellosolve, ethyl carbitol, ethyl carbitol acetate, butyl carbitol, and propyleneglycol monomethyl ether, amide compounds such as N,N-dimethylformamide and N-methylpyrrolidone, N,N-dimethylimidazolidone, and dimethylsulfoxide may be cited.

In the solvents cited above, water-miscible solvents, particularly such ether type compounds as tetrahydrofuran, dioxane and dioxolane, and such ketone type compounds as acetone are most advantageously used in respect that they have high levels of polymerization velocity and they repress the formation of a homopolymer of ethylene sulfide.

According to this invention, the amount of the polymerization solvent used is suitably selected taking account of the amounts of the ethylene sulfide, sulfur, polymerization initiator, and additive to be used. Typically, such amount may be appropriately selected as that the total amount of ethylene sulfide and sulfur be in the range of 10 to 80% by weight, particularly 20 to 60% by weight, based on the total amount of the raw material (i.e. the total amount of the ethylene sulfide, sulfur, polymerization initiator, and additive to be used).

The method for effecting the polymerization in the method for the production of this invention is not particularly limited. As typical examples of the method usable herein, a method which comprises first charging a reactor collectively with a raw material comprising ethylene sulfide, sulfur, a polymerization initiator, and a polymerization solvent optionally plus an additive and then heating the mixed raw material in the reactor, a method which comprises adding dropwise ethylene sulfide alone to the rest of the raw materials meanwhile polymerizing the raw material mixture, a method which comprises adding dropwise ethylene sulfide together with the additive meanwhile polymerizing the resultant mixture, a method which comprises adding dropwise ethylene sulfide together with a polymerization initiator meanwhile polymerizing the resultant mixture, and a method which comprises adding dropwise the whole raw materials meanwhile polymerizing the raw materials may be cited.

The ethylene sulfide/sulfur copolymer which is obtained 5 by the method for the production of this invention can be expressed by the following general formula (2):

  (2)

[wherein m: nx is in the range of 2:1 to 1:9, preferably in the range of 1:1 to 1:5].

Now, this invention will be described more specifically below with reference to working examples, which are not limitative of this invention. The term "parts" as used in this specification refers to "parts by weight" unless otherwise specified.

EXAMPLE 1

In a flask equipped with a stirrer, a thermometer, a nitrogen inlet, and a reflux condenser, 55.2 parts of sulfur, 10.3 parts of 1,4-diazabicyclo[2.2.2]octane (hereinafter referred to briefly as "DABCO"), and 150 parts of dioxane were charged and mixed and heated to 101° C. to reflux dioxane in a nitrogen atmosphere. To the mixture, 34.5 parts of ethylene sulfide (hereinafter referred to briefly as "ES") was added dropwise over 2 hours and allowed to react at the same temperature for additional five hours. The reaction solution consequently obtained was cooled, homogenized by the addition of carbon disulfide, and filtered. The filtrate was concentrated by the use of a rotary evaporator and then dried under a reduced pressure to produce 100 parts of a green viscous liquid (yield 100%). The conversion of ES calculated based on the amount of the product was nearly 100%. The glass transition temperature (Tg) determined by differential scanning calorimeter (DSC) was −33° C.

EXAMPLES 2 THROUGH 63

The polymerization procedure was carried out by following the procedure of Example 1 while changing the kinds and amounts of the charged raw materials, and the reaction conditions as shown in Tables 1 through 11. The results are shown in Tables 1 to 11. The abbreviations used in these tables represent the compound names indicated below.

DABCO: 1,4-Diazabicyclo[2.2.2]octane
TBAA: Tetrabutylammonium acetate
DTDE: Dithiodiethanol
ME: 2-Mercaptoethanol
TPS20: Di-t-dodecyl trisulfide (produced by Elf Atochem S.A.)
BM: Butyl mercaptan
OM: Octyl mercaptan
DM: Dodecyl mercaptan
TP: Thiophenol
MMP: Methyl 3-mercaptopropionate
THF: Tetrahydrofuran
2EHA: 2-Ethylhexyl acrylate
BMP: Butyl 3-mercaptopropionate
MTG: Methyl thioglycolate
ETG: Ethyl thioglycolate
OTG: 2-Ethylhexyl thioglycolate
DOL: Dioxolane
MA: Methyl acrylate
TMTD: Tetramethylthiuram disulfide
ZnEDC: Zinc diethyldithiocarbamate
MBTS: Di-2-benzothiazyl disulfide
NaMBT: Sodium salt of 2-mercaptobenzothiazole
DTDM: Dithiodimorpholine
EXAK: Potassium salt of ethylxanthic acid
CBS: N-Cyclohexyl-2-benzothiazolylsulfenamide In Tables 1 to 11, the bracket for the reaction conditions, temperature/R represents the reflux condition. Further, the symbols shown in the branckets for the after-treatment method are used to indicate the following method.

A: After the reaction, the reaction solution was homogenized by the addition of carbon disulfide and then filtered and the filtrate was concentrated by the use of a rotary evaporator and finally dried under a reduced pressure.

B: After the reaction, the precipitated solid was separated by filtration and the separated solid was washed with the solvent used in the reaction and then dried under a reduced pressure.

C: After the reaction, the reaction solution was filtered and the filtrate was concentrated by the use of a rotary evaporator and then dried under a reduced pressure.

In the bracket for the results of Tables 1 to 11, the term "conversion" represents the conversion of ES which was determined based on the total amount of the product or the results of gas chromatography. The viscosity shown therein was measured with a B type viscometer at 25° C. The Tg and the melting point shown therein were determined by DSC at a heating rate of 10° C./minute. The numerical value of the solid NMR shown therein represents the chemical shift at the peak of carbon atom. The copolymers obtained in Examples 2, 23, and 28 were analyzed by $^1$H-NMR and $^{13}$C-NMR and the copolymer obtained in Example 20 was analyzed by $^1$H-NMR.

TABLE 1

| Example | 1 | 2 | 3 | 4 | 5 | 6 |
|---|---|---|---|---|---|---|
| Charge to reactor | | | | | | |
| Sulfur | 55.2 | 55.2 | 46.6 | 57.1 | 53.3 | 59.8 |
| DABCO | 10.3 | 10.3 | 9.8 | | | 2.8 |
| TBAA | | | | 7.2 | 13.4 | |
| Dioxane | 150 | | | | | |
| Toluene | | 150 | 150 | 371 | 346 | |
| Carbon disulfide | | | | | | 389 |
| Dropwise addition | | | | | | |
| ES | 34.5 | 34.5 | 43.6 | 35.7 | 33.3 | 37.4 |
| Reaction conditions | | | | | | |
| Temperature (° C.) | R | R | 83–91 | 54–56 | 54–57 | R |
| Addition time (hr) | 2 | 2 | 2 | 1 | 1 | 1 |
| Aging time (hr) | 5 | 4 | 5 | 4 | 4 | 4 |
| After-treatment method | A | A | B | B | B | B |
| Results | | | | | | |
| Yield (%) | 100 | 86 | 73 | 78 | 68 | 27 |
| Conversion (%) | 100 | 79 | 86 | 100 | 100 | 74 |
| Appearance of product | Green viscous liquid | Green viscous liquid | Yellow solid | Yellow solid | Yellow solid | Yellow solid |
| Viscosity (cps) | — | — | — | — | — | — |
| Tg (° C.) | −33 | −26 | −15 | −22 | −3 | — |
| Melting point (° C.) | — | — | 110 | 126 | 129 | 85 |
| Solid NMR (ppm) | — | — | — | 37 | 38 | 38 |

TABLE 2

| Example | 7 | 8 | 9 | 10 | 11 |
|---|---|---|---|---|---|
| Charge to reactor | | | | | |
| Sulfur | 57.1 | 31.9 | 46.8 | 46.8 | 47.8 |
| DABCO | | 2.2 | 2.5 | 2.6 | 0.5 |
| TBAA | 7.2 | | | | |
| Toluene | | 100 | 150 | 100 | 100 |
| Carbon disulfide | 371 | | | | |
| Methanol | | | | 7.1 | 7.1 |
| DTDE | | 6.1 | 6.8 | 6.8 | 6.9 |
| Dropwise addition | | | | | |
| ES | 37.5 | 59.8 | 43.9 | 43.9 | 44.8 |
| Reaction conditions | | | | | |
| Temperature (° C.) | R | 53–60 | 54–57 | 53–58 | 53–59 |
| Addition time (hr) | 1 | 2 | 2 | 3 | 2 |
| Aging time (hr) | 4 | 3 | 3 | 3 | 3 |
| After-treatment method | B | B | B | B | B |
| Results | | | | | |
| Yield (%) | 59 | 94 | 92 | 95 | 88 |
| Conversion (%) | 100 | 100 | 96 | 96 | 82 |
| Appearance of product | Yellow solid | Yellow solid | Yellow solid | Yellow solid | Yellow solid |
| Viscosity (cps) | — | — | — | — | — |
| Tg (° C.) | — | — | −26 | — | — |
| Melting point (° C.) | 94 | 101 | 105 | 96 | 88 |
| Solid NMR (ppm) | 38 | — | — | — | — |

TABLE 3

| Example | 12 | 13 | 14 | 15 | 16 | 17 |
|---|---|---|---|---|---|---|
| Charge to reactor | | | | | | |
| Sulfur | 43.9 | 43.9 | 51.9 | 55.6 | 56.7 | 48.6 |
| DABCO | 2.3 | 2.3 | 2.4 | 2.6 | 0.5 | 2.5 |
| Dioxane | 100 | | | | | |
| Toluene | | | 295 | 100 | 100 | 150 |
| Acetone | | 100 | | | | |
| DTDE | 12.7 | 12.7 | 13.3 | 7.1 | 7.3 | |
| Dropwise addition | | | | | | |
| ES | 41.1 | 41.1 | 32.4 | 34.7 | 35.5 | 45.4 |
| ME | | | | | | 3.5 |
| Reaction conditions | | | | | | |
| Temperature (° C.) | 54–57 | R | 54–56 | 53–57 | 54–57 | 54–59 |
| Addition time (hr) | 2 | 2 | 1 | 5 | 5 | 2 |
| Aging time (hr) | 3 | 3 | 4 | 2 | 3 | 3 |
| After-treatment method | B | B | B | A | A | B |
| Results | | | | | | |
| Yield (%) | 89 | 85 | 45 | 83 | 100 | 94 |
| Conversion (%) | 100 | 80 | 85 | 77 | 100 | 98 |
| Appearance of product | Yellow solid | Yellow solid | Yellow solid | Red viscous liquid | Yellow solid | Yellow solid |
| Viscosity (cps) | — | — | — | — | — | — |
| Tg (° C.) | −28 | −30 | — | — | — | −22 |
| Melting point (° C.) | 95 | 110 | 94 | — | 95 | 118 |
| Solid NMR (ppm) | — | — | 38 | — | — | — |

TABLE 4

| Example | 18 | 19 | 20 | 21 | 22 |
|---|---|---|---|---|---|
| Charge to reactor | | | | | |
| Sulfur | 43.6 | 46.8 | 46.1 | 47.4 | 40.2 |
| DABCO | 9.1 | 8.7 | 8.6 | 8.8 | 7.5 |

TABLE 4-continued

| Example | 18 | 19 | 20 | 21 | 22 |
|---|---|---|---|---|---|
| Dioxane | | | | 150 | 150 |
| Toluene | 109 | 150 | 299 | | |
| ME | 6.4 | | | | |
| TPS20 | | | 16.6 | | |

TABLE 4-continued

| Example | 18 | 19 | 20 | 21 | 22 |
|---|---|---|---|---|---|
| Dropwise addition | | | | | |
| ES | 40.9 | 29.3 | 28.7 | 29.6 | 25.1 |
| ME | | 15.2 | | | |
| BM | | | | 14.2 | 27.2 |
| Reaction conditions | | | | | |
| Temperature (° C.) | R | R | R | R | R |
| Addition time (hr) | 2 | 2 | 1 | 2 | 2 |
| Aging time (hr) | 4 | 4 | 4 | 5 | 5 |
| After-treatment method | B | A | A | A | C |
| Results | | | | | |
| Yield (%) | 61 | 92 | 57 | 99 | 88 |
| Conversion (%) | 95 | 94 | 63 | 95 | 52 |
| Appearance of product | Yellow solid | Green viscous liquid | Green viscous liquid | Green viscous liquid | Green liquid |
| Viscosity (cps) | — | — | — | — | 310 |
| Tg (° C.) | −20 | −31 | −31 | −12 | −19 |
| Melting point (° C.) | 99 | — | — | — | — |
| Solid NMR (ppm) | — | — | — | — | — |

TABLE 5

| Example | 23 | 24 | 25 | 26 | 27 | 28 |
|---|---|---|---|---|---|---|
| Charge to reactor | | | | | | |
| Sulfur | 43.9 | 46.6 | 43.5 | 40.3 | 46.5 | 40.3 |
| DABCO | 7.7 | 7.8 | 8.1 | 7.5 | 8.7 | 7.5 |
| Dioxane | 150 | 100 | 150 | 150 | 150 | 150 |
| Dropwise addition | | | | | | |
| ES | 20.6 | 17.4 | 27.2 | 25.2 | 29.1 | 25.1 |
| BM | 27.8 | 28.2 | | | | |
| OM | | | 21.2 | 27.0 | | |
| DM | | | | | 15.7 | 27.1 |
| Reaction conditions | | | | | | |
| Temperature (° C.) | R | R | R | R | R | R |
| Addition time (hr) | 3 | 3 | 2 | 2 | 2 | 2 |
| Aging time (hr) | 3 | 3 | 5 | 5 | 5 | 5 |
| After-treatment method | C | C | A | A | A | A |
| Results | | | | | | |
| Yield (%) | 93 | 97 | 94 | 89 | 93 | 92 |
| Conversion (% Y) | 90 | 97 | 78 | 55 | 76 | 68 |
| Appearance of product | Green liquid | Green liquid | Green viscous liquid | Green viscous liquid | Green viscous liquid | Green viscous liquid |
| Viscosity (cps) | 400 | 300 | — | — | — | — |
| Tg (° C.) | −12 | −22 | −22 | −24 | — | −30 |
| Melting point (° C.) | — | — | — | — | — | — |
| Solid NMR (ppm) | — | — | — | — | — | — |

TABLE 6

| Example | 29 | 30 | 31 | 32 | 33 |
|---|---|---|---|---|---|
| Charge to reactor | | | | | |
| Sulfur | 43.0 | 42.9 | 49.5 | 40.2 | 45.7 |
| DABCO | 8.0 | 3.8 | 8.7 | 7.0 | 4.0 |
| Dioxane | 150 | 100 | 100 | 100 | 100 |
| Dropwise addition | | | | | |
| ES | 20.1 | 20.1 | 23.2 | 18.9 | 21.4 |
| BM | 28.9 | | | | |
| TP | | 33.2 | | | |
| MMP | | | 18.6 | 33.9 | 28.9 |
| Reaction conditions | | | | | |
| Temperature (° C.) | R | R | R | R | R |
| Addition time (hr) | 3 | 3 | 2 | 2 | 2 |
| Aging time (hr) | 5 | 3 | 4 | 4 | 4 |
| After-treatment method | A | A | A | C | A |
| Results | | | | | |
| Yield (%) | 95 | 86 | 100 | 95 | 90 |
| Conversion (%) | 73 | 56 | 100 | 72 | 66 |
| Appearance of product | Green viscous liquid | Green liquid | Green viscous liquid | Green viscous liquid | Green viscous liquid |
| Viscosity (cps) | 3000 | 720 | 8400 | 2200 | 2700 |
| Tg (° C.) | −38 | — | — | — | — |
| Melting point (° C.) | — | — | — | — | — |
| Solid NMR (ppm) | — | — | — | — | — |

TABLE 7

| Example | 34 | 35 | 36 | 37 | 38 | 39 |
|---|---|---|---|---|---|---|
| Charge to reactor | | | | | | |
| Sulfur | 43.9 | 45.7 | 43.4 | 44.3 | 43.9 | 43.8 |
| DABCO | 7.7 | 4.0 | 3.8 | 1.9 | 7.7 | 7.7 |
| Dioxane | 100 | 100 | 100 | 100 | 100 | 100 |
| Dropwise addition | | | | | | |
| ES | 20.6 | 21.4 | 20.4 | 20.8 | 20.6 | 20.6 |
| BMP | 27.8 | | | | | |
| MTG | | 28.9 | 32.4 | 33.0 | | |
| ETG | | | | | 27.8 | |
| OTG | | | | | | 27.9 |
| Reaction conditions | | | | | | |
| Temperature (° C.) | R | R | R | R | R | R |
| Addition time (hr) | 3 | 3 | 3 | 3 | 3 | 3 |
| Aging time (hr) | 3 | 3 | 3 | 3 | 3 | 3 |
| After-treatment method | A | A | A | A | A | A |
| Results | | | | | | |
| Yield (%) | 94 | 92 | 92 | 93 | 93 | 99 |
| Conversion (%) | 69 | 84 | 90 | 99 | 87 | 94 |
| Appearance of product | Green viscous liquid | Green viscous liquid | Green viscous liquid | Green viscous liquid | Green viscous liquid | Green viscous liquid |
| Viscosity (cps) | 5100 | 2300 | 1500 | 1300 | 3800 | 8100 |
| Tg (° C.) | — | — | — | — | — | — |
| Melting point (° C.) | — | — | — | — | — | — |
| Solid NMR (ppm) | — | — | — | — | — | — |

TABLE 8

| Example | 40 | 41 | 42 | 43 | 44 |
|---|---|---|---|---|---|
| Charge to reactor | | | | | |
| Sulfur | 35.2 | 25.5 | 35.0 | 29.8 | 46.9 |
| DABCO | 6.2 | 4.5 | 6.1 | 5.2 | 2.5 |
| Dioxane | 100 | 100 | 100 | 100 | |
| THF | | | | | 100 |
| DTDE | | | | | 6.8 |
| 2EHA | 27.5 | 20.1 | 32.0 | | |
| Dropwise addition | | | | | |
| ES | 16.5 | 12.0 | 16.4 | 14.0 | 43.9 |
| OTG | 42.1 | 30.5 | 22.3 | 19.0 | |
| Reaction conditions | | | | | |
| Temperature (° C.) | R | R | R | R | R |
| Addition time (hr) | 3 | 3 | 3 | 3 | 2 |
| Aging time (hr) | 3 | 3 | 3 | 3 | 4 |
| After-treatment method | A | C | C | C | A |
| Results | | | | | |
| Yield (%) | 93 | 94 | 93 | 94 | 100 |
| Conversion (%) | 83 | 75 | 79 | 78 | 100 |
| Appearance of product | Green viscous liquid | Red liquid | Red viscous liquid | Red liquid | Yellow solid |
| Viscosity (cps) | 1900 | 350 | 2900 | 850 | — |
| Tg (° C.) | — | — | — | — | −33 |
| Melting point (° C.) | — | — | — | — | 103 |
| Solid NMR (ppm) | — | — | — | — | — |

TABLE 9

| Example | 45 | 46 | 47 | 48 | 49 | 50 | 51 | 52 |
|---|---|---|---|---|---|---|---|---|
| Charge to reactor | | | | | | | | |
| Sulfur | 37.3 | 65.3 | 56.7 | 55.6 | 55.6 | 66.7 | 54.5 | 54.8 |
| DABCO | 3.3 | 2.7 | 0.5 | 2.6 | 2.6 | 0.6 | 0.5 | |
| Dioxane | 100 | | | | | | | |
| THF | | 100 | 100 | 100 | | | 100 | 100 |
| DOL | | | | | 100 | 100 | | |
| DTDE | | 7.5 | 7.3 | 7.1 | 7.1 | 7.7 | | |
| MA | 18.8 | | | | | | | |
| TMTD | | | | | | | 10.9 | 11.0 |

TABLE 9-continued

| Example | 45 | 46 | 47 | 48 | 49 | 50 | 51 | 52 |
|---|---|---|---|---|---|---|---|---|
| Dropwise addition | | | | | | | | |
| ES | 17.5 | 24.5 | 35.5 | 34.7 | 34.7 | 25.0 | 34.1 | 34.2 |
| MFG | 23.2 | | | | | | | |
| Reaction conditions | | | | | | | | |
| Temperature (° C.) | R | R | R | R | R | R | R | R |
| Addition time (hr) | 3 | 5 | 3 | 3 | 3 | 5 | 3 | 3 |
| Aging time (hr) | 3 | 4 | 3 | 3 | 3 | 3 | 3 | 3 |
| After-treatment method | C | A | A | A | A | A | C | C |
| Results | | | | | | | | |
| Yield (%) | 92 | 100 | 97 | 99 | 85 | 98 | 98 | 99 |
| Conversion (%) | 99 | 100 | 93 | 96 | 100 | 98 | 98 | 99 |
| Appearance of product | Red liquid 420 | Red viscous liquid | Yellow solid | Yellow solid | Brown viscous liquid | Brown viscous liquid | Yellow viscous liquid | Yellow viscous liquid |
| Viscosity (cps) | — | — | — | — | — | — | — | — |
| Tg (° C.) | — | — | −31 | −27 | — | — | — | — |
| Melting point (° C.) | — | — | 86 | 81 | — | — | — | — |
| Solid NMR (ppm) | — | — | — | — | — | — | — | — |

TABLE 10

| Example | 53 | 54 | 55 | 56 | 57 |
|---|---|---|---|---|---|
| Charge to reactor | | | | | |
| Sulfur | 51.9 | 52.3 | 60.9 | 56.2 | 57.7 |
| DABCO | | 0.5 | | | 0.5 |
| THF | 100 | 100 | 100 | 100 | 100 |
| ZnEDC | 15.6 | | | | |
| MBTS | | 14.5 | | 7.8 | |
| NaMBT | | | 1.0 | 0.9 | |
| DTDM | | | | | 5.7 |
| Dropwise addition | | | | | |
| ES | 32.5 | 32.7 | 38.1 | 35.1 | 36.1 |
| Reaction conditions | | | | | |
| Temperature (° C.) | R | R | R | R | R |
| Addition time (hr) | 3 | 3 | 3 | 3 | 3 |
| Aging time (hr) | 3 | 3 | 3 | 3 | 3 |
| After-treatment method | A | A | B | A | A |
| Results | | | | | |
| Yield (%) | 87 | 94 | 77 | 98 | 88 |
| Conversion (%) | 75 | 83 | 98 | 100 | 67 |
| Appearance of product | Yellow viscous liquid | Brown viscous liquid | Yellow solid | Yellow viscous liquid | Yellow viscous liquid |
| Viscosity (cps) | — | — | — | — | — |
| Tg (° C.) | — | — | — | — | — |
| Melting point (° C.) | — | — | 99 | — | — |
| Solid NMR (ppm) | — | — | — | — | — |

TABLE 11

| Example | 58 | 59 | 60 | 61 | 62 | 63 |
|---|---|---|---|---|---|---|
| Charge to reactor | | | | | | |
| Sulfur | 53.9 | 53.8 | 61.0 | 56.3 | 61.0 | 60.0 |
| DABCO | 0.5 | | | | | |
| NaMBT | | 0.8 | | | | |
| EXAK | | | 0.8 | 0.7 | 0.8 | 0.8 |
| THF | 100 | 100 | 100 | 100 | | |
| Acetone | | | | | 100 | 100 |
| CBS | 11.9 | 11.8 | | | | |
| MBTS | | | | 7.8 | | 1.7 |
| Dropwise addition | | | | | | |
| ES | 33.7 | 33.6 | 38.2 | 35.2 | 38.2 | 37.5 |

TABLE 11-continued

| Example | 58 | 59 | 60 | 61 | 62 | 63 |
|---|---|---|---|---|---|---|
| Reaction conditions | | | | | | |
| Temperature (° C.) | R | R | R | R | R | R |
| Addition time (hr) | 3 | 3 | 3 | 3 | 3 | 3 |
| Aging time (hr) | 3 | 3 | 3 | 3 | 3 | 3 |
| After-treatment method | A | A | B | A | B | B |
| Results | | | | | | |
| Yield (%) | 100 | 100 | 90 | 100 | 83 | 80 |
| Conversion (%) | 100 | 100 | 100 | 100 | 97 | 98 |
| Appearance of product | Red viscous liquid | Red viscous liquid | Yellow solid | Yellow viscous liquid | Yellow solid | Yellow solid |
| Viscosity (cps) | — | — | — | — | — | — |
| Tg (° C.) | — | — | — | — | — | — |
| Melting point (° C.) | — | — | — | — | — | — |
| Solid NMR (ppm) | — | — | — | — | — | — |

The entire disclosure of Japanese Patent Application No. 08-118,834 filed on May 14, 1996 including specification, claims, drawings and summary are incorporated herein by reference in its entirety.

What is claimed is:

1. A method for the production of an ethylene sulfide/sulfur copolymer characterized by polymerizing ethylene sulfide with sulfur in the presence of at least one polymerization initiator selected from the group consisting of organic amines, quaternary ammonium salts, metal salts of 2-mercaptobenzothiazole, metal salts of dialkyl dithiocarbamic acid and metal salts of alkylxanthic acid.

2. A method according to claim 1, wherein said organic amine is an aliphatic tertiary amine.

3. A method according to claim 2, wherein said aliphatic tertiary amine is 1,4-diazabicyclo[2.2.2]octane.

4. A method for production of an ethylene sulfide/sulfur copolymer characterized by polymerizing ethylene sulfide, sulfur and at least one member selected from the group consisting of organic mercaptan compounds, polysulfide compounds and sulfenamide compounds in the presence of at least one polymerization initiator selected from the group consisting of organic amines, quaternary ammonium salts, metal salts of 2-mercaptobenzothiazole, acid, and metal salts of alkylxanthic acid.

5. A method according to claim 4, wherein said organic mercaptan compound is at least one member selected from the group consisting of alkyl mercaptans, aryl mercaptans, alkylaryl mercaptans, hydroxyalkyl mercaptans, thioglycolic acid alkyl esters, and mercaptopropionic acid alkyl esters.

6. A method according to claim 4, wherein said polysulfide compound is at least one member selected from the group consisting of alkyl polysulfides, hydroxyalkyl polysulfides, tetralkylthiuram polysulfides, dibenzothiazyl polysulfides and polythiodimorpholines.

7. A method according to claim 4, wherein said sulfenamide compound is at least one member selected from the group consisting of N-cyclohexyl-2-benzothiazolylsulfenamide, N-t-butyl-2-benzothiazolylsulfenamide, N-oxydiethylene-2-benzothiazolylsulfenamide, N,N-dicyclohexyl-2-benzothiazolylsulfenamide and N,N-diisopropyl-2-benzothiazolylsulfenamide.

* * * * *